US009142357B2

(12) United States Patent
Matsumoto

(10) Patent No.: US 9,142,357 B2
(45) Date of Patent: Sep. 22, 2015

(54) SEPARATOR FOR ELECTRIC STORAGE DEVICE AND ELECTRIC STORAGE DEVICE

(75) Inventor: Kazuaki Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 149 days.

(21) Appl. No.: 13/981,027

(22) PCT Filed: Feb. 21, 2012

(86) PCT No.: PCT/JP2012/054103
§ 371 (c)(1), (2), (4) Date: Jul. 22, 2013

(87) PCT Pub. No.: WO2012/115093
PCT Pub. Date: Aug. 30, 2012

(65) Prior Publication Data

US 2013/0302702 A1 Nov. 14, 2013

(30) Foreign Application Priority Data

Feb. 24, 2011 (JP) ................................ 2011-038318
Jul. 20, 2011 (JP) ................................ 2011-159107

(51) Int. Cl.
*H01G 9/02* (2006.01)
*H01M 2/14* (2006.01)
*H01M 2/16* (2006.01)
*H01G 11/52* (2013.01)
(Continued)

(52) U.S. Cl.
CPC ................. *H01G 9/02* (2013.01); *H01G 11/06* (2013.01); *H01G 11/52* (2013.01); *H01M 2/145* (2013.01); *H01M 2/1626* (2013.01); *H01M 2/1633* (2013.01); *H01G 11/60* (2013.01); *Y02E 60/13* (2013.01); *Y02T 10/7022* (2013.01); *Y10T 29/49108* (2015.01)

(58) Field of Classification Search
None
See application file for complete search history.

(56) References Cited

U.S. PATENT DOCUMENTS 6,489,062 B1 12/2002 Watanabe et al.
6,511,774 B1 1/2003 Tsukuda et al.
2004/0234865 A1 11/2004 Sato et al.
(Continued)

FOREIGN PATENT DOCUMENTS

JP 61-284070 A 12/1986
JP 8-306352 A 11/1996
(Continued)

OTHER PUBLICATIONS

Communication dated Feb. 9, 2015, issued by the State Intellectual Property Office of the People's Republic of China in counterpart Application No. 201280010369.
(Continued)

*Primary Examiner* — Patrick Ryan
*Assistant Examiner* — Christopher Domone
(74) *Attorney, Agent, or Firm* — Sughrue Mion, PLLC

(57) ABSTRACT

The object of an exemplary embodiment of the invention is to provide a separator for an electric storage device which has small heat shrinkage in a high-temperature environment, and in which the increase of the battery temperature can be suppressed. An exemplary embodiment of the invention is a separator for an electric storage device, which comprises a cellulose derivative represented by a prescribed formula. The separator for an electric storage device can be obtained, for example, by treating a cellulose separator containing cellulose with a halogen-containing carboxylic acid or a halogen-containing alcohol.

12 Claims, 2 Drawing Sheets

(51) Int. Cl.
*H01G 11/06* (2013.01)
*H01G 11/60* (2013.01)

(56) References Cited

U.S. PATENT DOCUMENTS

| | | | | |
|---|---|---|---|---|
| 2007/0202394 | A1 * | 8/2007 | Viavattine | 429/144 |
| 2008/0241660 | A1 | 10/2008 | Ogawa et al. | |

FOREIGN PATENT DOCUMENTS

| | | | |
|---|---|---|---|
| JP | 2000-048792 | A | 2/2000 |
| JP | 2000-173574 | A | 6/2000 |
| JP | 2001-148242 | A | 5/2001 |
| JP | 2002-194125 | A | 7/2002 |
| JP | 2003-123724 | A | 4/2003 |
| JP | 2004-327279 | A | 11/2004 |
| JP | 2004-342318 | A | 12/2004 |
| JP | 2005-078847 | A | 3/2005 |
| JP | 2006-221972 | A | 8/2006 |
| JP | 2007-073382 | A | 3/2007 |
| JP | 2008-243482 | A | 10/2008 |
| WO | 98/32184 | A1 | 7/1998 |

OTHER PUBLICATIONS

Xianming Wang, et al., "Nonflammable Trimethyl Phosphate Solvent-Containing Electrolytes for Lithium-Ion Batteries", Journal of the Electrochemical Society, 2001, pp. A1058-A1065, vol. 148, No. 10.

* cited by examiner

SEPARATOR FOR ELECTRIC STORAGE DEVICE AND ELECTRIC STORAGE DEVICE

CROSS REFERENCE TO RELATED APPLICATIONS

This application is a National Stage of International Application No. PCT/JP2012/054103 filed Feb. 21, 2012, claiming priority based on Japanese Patent Application Nos. 2011-038318, filed Feb. 24, 2011 and 2011-159107, filed Jul. 20, 2011, the contents of all of which are incorporated herein by reference in their entirety.

TECHNICAL FIELD

The present invention relates to a separator for an electric storage device and an electric storage device.

BACKGROUND ART

With rapidly expanding the market of laptop computers, mobile phones, electric vehicles, and the like, electric storage devices such as capacitors and secondary batteries are actively studied. Among these, secondary batteries are attractive at the point that they can store more energy. Currently, secondary batteries having greater high energy density are required, and it is proposed, as a candidate, to use a metal such as tin or silicone, an alloy or oxide thereof for the negative electrode active substance. Also, it is also proposed to use a battery having a large theoretical capacity such as a lithium air battery. However, in the battery having high energy density, abnormal heat generation may occur due to overcharge. Therefore, it is desired to develop a battery having not only high energy density but also excellent safety.

As a method for improving safety, a method which makes the electrolyte liquid flame retardant is proposed (Non-Patent Document 1). There is also a proposed function to stop the movement of ions by dissolving the separator at higher temperature to result in clogging (so-called shut down function). These methods have a certain effect, but a safer technology is required in order to ensure the safety of the battery which is large and has high capacity.

Here, Patent Document 1 discloses a technology to use a paper produced by using cellulose fiber having high heat resistance as the separator. Also, in order to suppress oxidation/reduction reaction of a hydroxyl group (—OH) of cellulose, a method in which the hydroxyl group of cellulose is esterified is proposed in Patent Document 2.

CITATION LIST

Patent Document

Patent Document 1: JP 8-306352 A
Patent Document 2: JP 2003-123724 A

Non-Patent Document

Non-Patent Document 1: Journal of the Electrochemical Society, 148 (10) A1058-A1065 (2001)

SUMMARY OF THE INVENTION

Problem to be Solved by the Invention

The separator mainly used until now is a polyolefin-based fine-porous separator composed of a polypropylene or polyethylene material. However, the polyolefin-based fine-porous separator may be shrink at high temperatures. Therefore, in the polyolefin-based fine-porous separator, thermal shrinkage at the time of abnormal heat generation may occur to result in short-circuit of the positive electrode and the negative electrode.

In order to solve this problem, as mentioned above, the use of a separator which contains cellulose having high heat resistance as a main component is proposed in Patent Document 1. Cellulose has an excellent property that prevents the occurrence of thermal shrinkage even if the temperature is set to be high such as near 180° C.

Also, in secondary batteries having a high energy density, the temperature of the battery tends to increase in the case where it is overcharged or in the case where strong impact is made from outside. Therefore, a battery having small temperature increases due to overcharge or due to impact from the outside is desired.

Thus, one of the objects of an exemplary embodiment of the invention is to provide a separator for an electric storage device which has small thermal shrinkage in a high-temperature environment, and in which an increase of the battery temperature can be suppressed.

Also, one of the objects of an exemplary embodiment of the invention is to provide an electric storage device, preferably a lithium secondary battery, in which an increase of the battery temperature can be suppressed.

Means of Solving the Problem

One of the exemplary embodiments of the inventions is:

a separator for an electric storage device, comprising a cellulose derivative represented by formula (1):

formula (1)

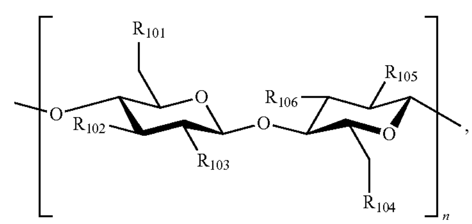

wherein, in formula (1), $R_{101}$ to $R_{106}$ each independently represent hydroxy group, a halogen-containing ester group or a halogen-containing ether group, and at least one of $R_{101}$ to $R_{106}$ is a halogen-containing ester group or a halogen-containing ether group; the halogen-containing ester group is represented by formula (2) and the halogen-containing ether group is represented by formula (3); and n is an integer number of 2 or more, and $R_{101}$ to $R_{106}$ are respectively independent in every n;

formula (2)

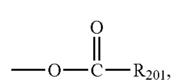

wherein, in formula (2), $R_{201}$ represents an alkyl group containing a halogen atom; and $$—O—R_{301} \qquad \text{formula (3),}$$

wherein, in formula (3), $R_{301}$ represents an alkyl group containing a halogen atom.

One of the exemplary embodiments of the inventions is:

a separator for an electric storage device, wherein at least a part of hydroxy group on a fiber surface of a separator whose main component is a cellulose fiber is replaced by a halogen-containing ester group represented by above-mentioned formula (2).

One of the exemplary embodiments of the inventions is:

a separator for an electric storage device, wherein at least a part of hydroxy group on a fiber surface of a separator whose main component is a cellulose fiber is replaced by a halogen-containing ether group represented by above-mentioned formula (3).

One of the exemplary embodiments of the inventions is:

a separator for an electric storage device, wherein at least a part of hydroxy group on a fiber surface of a separator whose main component is an inorganic fiber is replaced by a halogen-containing ester group represented by above-mentioned formula (2).

One of the exemplary embodiments of the inventions is:

a separator for an electric storage device, wherein at least a part of hydroxy group on a fiber surface of a separator whose main component is an inorganic fiber is replaced by a halogen-containing ether group represented by above-mentioned formula (3).

One of the exemplary embodiments of the inventions is:

an electric storage device, comprising the above-mentioned separator for an electric storage device, a negative electrode comprising a negative electrode active substance, and an electrolyte liquid comprising a supporting salt and a nonaqueous electrolyte solvent.

One of the exemplary embodiments of the inventions is:

a method for producing a separator for an electric storage device, comprising making a cellulose separator, whose main component is cellulose, come into contact with a solution comprising a halogen-containing carboxylic acid represented by formula (4):

formula (4)

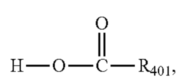

wherein, in formula (4), $R_{401}$ represents an alkyl group containing a halogen atom.

One of the exemplary embodiments of the inventions is:

a method for producing a separator for an electric storage device, comprising making a cellulose separator, whose main component is cellulose, come into contact with a solution comprising a halogen-containing alcohol represented by formula (5):

$$H—O—R_{501} \quad \text{formula (5)},$$

wherein, in formula (5), $R_{501}$ represents an alkyl group containing a halogen atom.

One of the exemplary embodiments of the inventions is:

a method for producing a separator for an electric storage device, comprising making an inorganic material-containing separator, which comprises an inorganic fiber comprising a hydroxy group on a surface thereof, come into contact with a solution comprising a halogen-containing carboxylic acid represented by above-mentioned formula (4).

One of the exemplary embodiments of the inventions is:

method for producing a separator for an electric storage device, comprising making an inorganic material-containing separator, which comprises an inorganic fiber comprising a hydroxy group on a surface thereof, come into contact with a solution comprising a halogen-containing alcohol represented by above-mentioned formula (5).

One of the exemplary embodiments of the inventions is:

an electric storage device, comprising a separator for an electric storage device produced by the above-mentioned production method, a negative electrode comprising a negative electrode active substance, and an electrolyte liquid comprising a supporting salt and a nonaqueous electrolyte solvent.

One of the exemplary embodiments of the inventions is:

an electric storage device, comprising at least: a negative electrode comprising a negative electrode active substance, an electrolyte liquid comprising a nonaqueous electrolyte solvent and a separator;

wherein the negative electrode active substance comprises at least one of metal (b) that can be alloyed with lithium and metal oxide (c) that can absorb and desorb lithium ion; and wherein the separator is an inorganic material-containing separator whose main component is an inorganic fiber.

Effect of the Invention

One of an exemplary embodiment according to the invention can provide an electric storage device in which the increase of the battery temperature can be suppressed.

One of an exemplary embodiment according to the invention can provide a separator for an electric storage device which has small thermal shrinkage in a high-temperature environment, in which the increase of the battery temperature can be suppressed, and which has a high discharge capacity. Thus, an electric storage device, which has a separator for an electric storage device of an exemplary embodiment according to the invention, has a high discharge capacity, and also has high safety.

MODE FOR CARRYING OUT THE INVENTION

Embodiment 1

Figure 1:
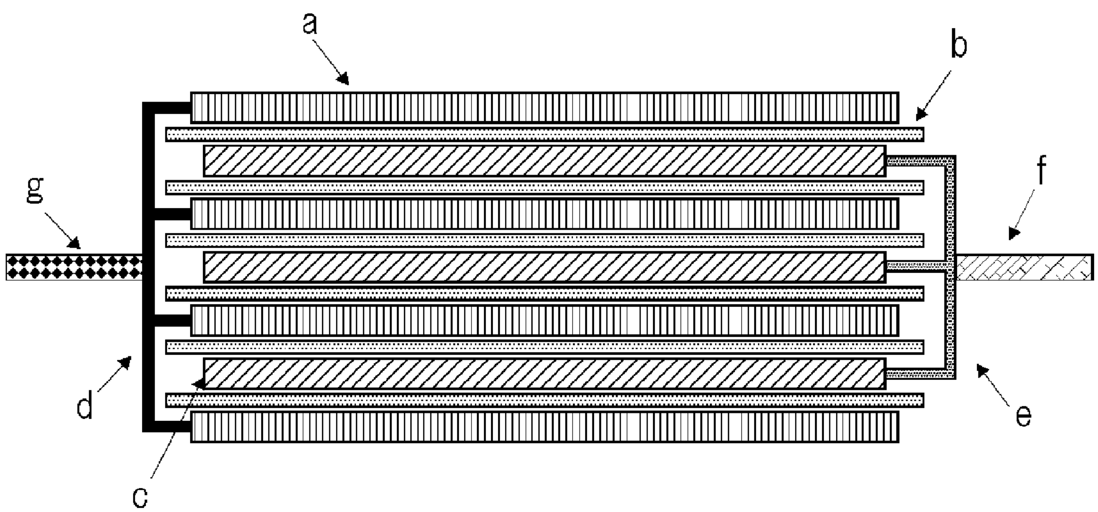
FIG. 1 shows a schematic sectional view of a structure in a stacked laminate type secondary battery.

As mentioned above, one of an exemplary embodiment of the invention is a separator for an electric storage device, which contains a cellulose derivative represented by formula (1):

formula (1)

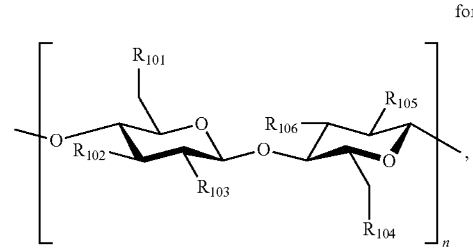

wherein, in formula (1), $R_{101}$ to $R_{106}$ each independently represent hydroxy group, a halogen-containing ester group or a halogen-containing ether group, and at least one of $R_{101}$ to $R_{106}$ is a halogen-containing ester group or a halogen-containing ether group; the halogen-containing ester group is represented by formula (2) and the halogen-containing ether group is represented by formula (3); and n is an integer number of 2 or more, and $R_{101}$ to $R_{106}$ are respectively independent in every n;

formula (2)

$$—O—\overset{\displaystyle O}{\overset{\|}{C}}—R_{201},$$

wherein, in formula (2), $R_{201}$ represents an alkyl group containing a halogen atom; and $$—O—R_{301} \qquad \text{formula (3),}$$

wherein, in formula (3), $R_{301}$ represents an alkyl group containing a halogen atom.

In formulae (2) and (3), the alkyl group containing a halogen atom (hereinafter, also abbreviated to halogen-containing alkyl group) is preferably an alkyl group with a carbon number of 1 to 8, is more preferably an alkyl group with a carbon number of 1 to 6, and is further preferably an alkyl group with a carbon number of 1 to 4. Also, the alkyl group includes straight-chain type alkyl groups, branched-chain type alkyl groups or cyclic-chain type alkyl groups. The halogen atom is preferably fluorine atom. Hereinafter, the alkyl group containing fluorine atom is referred to as fluorine-containing alkyl group. The halogen-containing alkyl group is preferably a fluorine-containing alkyl group. Examples of the fluorine-containing alkyl group include, for example, perfluoromethyl group, perfluoroethyl group and perfluoropropyl group.

A separator for an electric storage device of an exemplary embodiment of the invention may be formed, for example, by making a paper with a fiber of the esterified or etherified cellulose by paper-making method. Also, it may be formed by making a weave with a fiber of the esterified or etherified cellulose. Also, it can be obtained by esterification or etherification treatment of a cellulose separator which is conventionally used as the separator. In this case, it is desirable to remove binders such as polyethyleneimines, sodium alginate and polyacrylamides which may be used when the cellulose is produced, before or during the treatment.

The thickness of a separator for an electric storage device of an exemplary embodiment of the invention is preferably, but should not particularly be limited to, 10 μm or more and 200 μm or less, is more preferably 20 μm or more and 100 μm or less, and further desirably 50 μm or less, in the case when it is used alone. This is because the strength in the film thickness direction is improved and the generation of an internal short-circuit is suppressed when it is 10 μm or more. Also, when it is 50 μm or less, the increase of internal resistance and the decrease of the discharge capacity can be suppressed. Note that, in the case where one film is laminated with another film to form a separator, the thickness of each film may be appropriately determined based on the total thickness of the films which are formed by lamination.

Also, the porosity is desirably 30% or more and 99% or less. This is because the film resistance is deceased and the battery performance is improved when it is 30% or more, as in the case of the average pore size. In order to further decrease the liquid resistance, the porosity is more desirably 55% or more. More preferably, the porosity is 60% or more. Also, this is because the generation of an internal short-circuit is suppressed when it is 99% or less. The porosity can be calculated, for example, from the true density and the total volume of the material that is a raw material of the fine-porous film and from the weight and the volume of the fine-porous film. Further, from the stand point of suppressing the generation of the internal short-circuit, the anti-pinhole strength in the film thickness direction is desirably a certain level value or more. The anti-pinhole strength can be evaluated, for example, from the load when a metal needle (diameter 1 to 2 mm, tip r=0.5 mm) is stuck into the fine-porous film as a measuring object with a constant speed by using a strength testing machines such as a texture analyzer.

Embodiment 2

Also, a separator for an electric storage device according to one of an exemplary embodiment of the invention is a separator for an electric storage device, wherein at least a part of hydroxy group on a fiber surface of a separator whose main component is a cellulose fiber is replaced by a halogen-containing ester group represented by above-mentioned formula (2).

The separator whose main component is a cellulose fiber preferably contains 30 mass % or more of the cellulose fiber in the constitutional materials, more preferably contains 50% or more of it, further preferably contains 70% or more of it, and particularly preferably contains 90% or more of it.

A separator for an electric storage device according to an exemplary embodiment of the invention can be obtained by making a cellulose separator, whose main component is cellulose, come into contact with a solution containing a halogen-containing carboxylic acid and preferably by carrying out heat-treatment in a state where the separator is made to contact with the solution. In other words, a production method according to an exemplary embodiment of the invention is also understood to be a method for producing a separator for an electric storage device, in which a cellulose separator whose main component is cellulose is made to contact with a solution containing a halogen-containing carboxylic acid.

The halogen-containing carboxylic acid is represented by formula (4):

formula (4)

$$H—O—\overset{\displaystyle O}{\overset{\|}{C}}—R_{401},$$

wherein, in formula (4), $R_{401}$ represents an alkyl group containing a halogen atom.

In formula (4), the halogen-containing alkyl group is preferably an alkyl group with a carbon number of 1 to 8, is more preferably an alkyl group with a carbon number of 1 to 6, and is further preferably an alkyl group with a carbon number of 1 to 4. Also, the alkyl group includes straight-chain type alkyl groups, branched-chain type alkyl groups or cyclic-chain type alkyl groups. The halogen atom is preferably fluorine atom. The halogen-containing alkyl group is preferably a fluorine-containing alkyl group. Examples of the fluorine-containing alkyl group include, for example, perfluoromethyl group, perfluoroethyl group and perfluoropropyl group.

Examples of the halogen-containing carboxylic acid include, for example, trifluoroacetic acid, pentafluoropropionic acid, monochloroacetic acid, dichloroacetic acid, trichloroacetic acid, pentachloropropionic acid, dichloromonofluoroacetic acid, monochlorodifluoroacetic acid, monobromoacetic acid, dibromoacetic acid, tribromoacetic acid, iodoacetic acid, 2-chloropropionic acid, 3-chloropropionic acid, 2-bromopropionic acid, 2-iodopropionic acid, 3-iodopropionic acid, 2,3-dichloropropionic acid, 2,3-dibromopropionic acid, 2-chloroacrylic acid and 2-chlorocrotonic acid.

Here, the treatment of the cellulose separator with a halogen-containing carboxylic acid is described. First, in an exemplary embodiment of the invention, the cellulose separator whose main component is cellulose is made to contact with a solution containing a halogen-containing carboxylic acid. Also, it is preferable to carry out heat treatment in a state where the cellulose separator is made to contact with the solution.

Further, it is preferable to carry out heat treatment in a state where the cellulose separator is immersed in the solution containing a halogen-containing carboxylic acid.

The solution preferably contains 70% or more of a halogen-containing carboxylic acid, more preferably contains 90% or more, and further preferably contains 99% or more. Also, an anhydride may be used as the halogen-containing carboxylic acid in order to improve reactivity. Also, a PH adjuster, a catalyst, or the like can be added in order to control the reaction.

The temperature of the solution in heat treatment is preferably 50° C. or higher and 160° C. or lower from the standpoint that the hydroxy group of cellulose is easily reacted with the halogen-containing carboxylic acid, is more preferably 60° C. or higher and 150° C. or lower, and is further preferably 70° C. or higher and 140° C. or lower.

The time of the heat treatment should not particularly be limited, but is 30 minutes or more, for example.

By making a cellulose separator, come into contact with a solution containing a halogen-containing carboxylic acid, and preferably by heating it in the solution, the hydroxy group of the cellulose is thought to be esterified. In other words, for example, by carrying out heat treatment in a state where a cellulose separator is immersed in a halogen-containing carboxylic acid such as trifluoroacetic acid, the hydroxy group of cellulose reacts with the carboxy group of the halogen-containing carboxylic acid, and then the halogen-containing alkyl group is thought to be added to the cellulose separator through an ester group.

Also, by the treatment using a halogen-containing carboxylic acid as mentioned above, a halogen-containing ester group is introduced into the surface of the cellulose fiber of the cellulose separator.

In this case, in order to promote the reaction of the halogen-containing carboxylic acid with the hydroxyl group of the cellulose, an acid may be added to the solution in an appropriate amount. Examples of the acids include, for example, hydrochloric acid, sulfuric acid, concentrated sulfuric acid and phosphoric acid. The pH of the solution is preferably 1 to 8 and is more preferably 3 to 7.

The cellulose separator should not particularly be limited, and can be used without any particular problem as long as it is a separator containing cellulose. For example, well-known separators containing cellulose can be used.

Also, the cellulose separator may be a nonwoven cloth produced containing a material other than cellulose to improve the strength as long as it contains cellulose. Examples of the material other than cellulose include, for example, resin materials such as polypropylenes, polyethylenes, polyethylene terephthalates (PET), polytetrafluoroethylenes, polyvinylidene fluorides, polyimides and polyamide-imides. Also, materials, in which one side or both sides of the cellulose is chemically modified with this material or is physically modified by spin coat or the like, may be used. Also, cellulose papers, which are physically coated with aluminum oxide on the surface by application or spin coat, may be used.

Also, as the cellulose separator, materials, in which a film or a paper composed of a resin material such as a polyethylene, a polypropylene, a polyethylene terephthalate, a polytetrafluoroethylene, a polyvinylidene fluoride, a polyimide, or a polyamide-imide is laminated on a cellulose paper, can be used.

Also, the cellulose separator preferably contains 30 mass % or more of cellulose fiber in the constitutional materials in order to keep the strength when it was immersed in the electrolyte liquid. Also, when it contains 50 mass % or more of cellulose fiber, the internal short-circuit of the battery can be further suppressed. Further preferably, it is a nonwoven cloth which contains 70 mass % or more of cellulose fiber in the constitutional materials. Also, the cellulose separator whose main component is cellulose preferably contains cellulose fiber as a main component.

After heat treatment in the solution, drying treatment can appropriately be carried out.

Also, after the reaction, the solution can be removed by washing. Examples of the solvent used for washing include, for example, nonaqueous solvents such as chloroform, acetonitrile or hexane.

Also, the thickness of the cellulose separator used for the production is preferably, but should not particularly be limited to, 10 μm or more and 200 μm or less, is more preferably 20 μm or more and 100 μm or less, and further desirably 50 μm or less, in the case when it is used alone. This is because the strength in the film thickness direction is improved and the generation of an internal short-circuit is suppressed when it is 10 μm or more. Also, when it is 50 μm or less, the increase of internal resistance and the decrease of the discharge capacity can be suppressed. Note that, in the case where one film is laminated with another film to form a separator, the thickness of each film may be appropriately determined based on the total thickness of the films which are formed by lamination.

Also, the porosity of the cellulose separator used for the production is desirably 30% or more and 99% or less. This is because the film resistance is deceased and the battery performance is improved when it is 30% or more, as in the case of the average pore size. In order to decrease the liquid resistance more, the porosity is more desirably 55% or more. More preferably, the porosity is 60% or more. Also, this is because the generation of the internal short-circuit is suppressed when it is 99% or less. The porosity can be calculated, for example, from the true density and the total volume of the material that is a raw material of the fine-porous film and from the weight and the volume of the fine-porous film. Further, from the stand point of suppressing the generation of the internal short-circuit, the anti-pinhole strength in the film thickness direction is desirably a certain level value or more. The anti-pinhole strength can be evaluated, for example, from the load when a metal needle (diameter 1 to 2 mm, tip r=0.5 mm) is stuck into the fine-porous film as measuring object with a constant speed by using a strength testing machines such as a texture analyzer.

Examples of another embodiment of the above-mentioned production method include a method in which the esterification reaction is carried out by adding a halogen-containing carboxylic acid to cellulose fiber and preferably by further heat treatment, and in which a nonwoven cloth is formed using the fiber obtained.

Embodiment 3

Also, a separator for an electric storage device according to one of an exemplary embodiment of the invention is a separator for an electric storage device, wherein at least a part of hydroxy group on a fiber surface of a cellulose separator whose main component is a cellulose fiber is replaced by a halogen-containing ether group represented by above-mentioned formula (3).

The separator preferably contains 30 mass % or more of the cellulose fiber in the constitutional materials, more preferably contains 50% or more of it, further preferably contains 70% or more of it, and particularly preferably contains 90% or more of it.

A separator for an electric storage device according to an exemplary embodiment of the invention can be obtained by making a cellulose separator, whose main component is cellulose fiber, come into contact with a solution containing a halogen-containing alcohol and preferably by carrying out heat-treatment in a state of contacting. In other words, a production method according to an exemplary embodiment of the invention is also understood to be a method for producing a separator for an electric storage device, in which a cellulose separator whose main component is cellulose fiber is made to contact with a solution containing a halogen-containing alcohol.

The halogen-containing alcohol is represented by formula (5):

$$H—O—R_{501} \quad \text{formula (5),}$$

wherein, in formula (5), $R_{501}$ represents an alkyl group containing a halogen atom.

In formula (5), the halogen-containing alkyl group is preferably an alkyl group with a carbon number of 1 to 8, is more preferably an alkyl group with a carbon number of 1 to 6, and is further preferably an alkyl group with a carbon number of 1 to 4. Also, the alkyl group includes straight-chain type alkyl groups, branched-chain type alkyl groups or cyclic-chain type alkyl groups. The halogen atom is preferably fluorine atom. The halogen-containing alkyl group is preferably a fluorine-containing alkyl group. Examples of the fluorine-containing alkyl group include, for example, perfluoromethyl group, perfluoroethyl group and perfluoropropyl group.

Examples of the halogen-containing alcohol include, for example, trifluoroethanol, pentafluoropropanol (2,2,3,3,3-pentafluoropropanol), trichloroethanol, pentachloropropanol, 2-fluoroethanol, 2-bromoethanol, 3-iodoethanol, 2,2-difluoroethanol and 2,2-dichloroethanol.

Here, the treatment of the cellulose separator with a halogen-containing alcohol is described. First, in an exemplary embodiment of the invention, the cellulose separator whose main component is cellulose fiber is made to contact with a solution containing a halogen-containing alcohol.

Further, it is preferable to carry out heat treatment in a state where the cellulose separator is immersed in the solution containing a halogen-containing alcohol.

The solution preferably contains 70% or more of a halogen-containing alcohol, more preferably contains 90% or more, and further preferably contains 99% or more. Also, in order to control the reaction, the concentration may be adjusted with a solvent such as water, and a PH adjuster, a catalyst, or the like can also be added.

The temperature of the solution in heat treatment is preferably 50° C. or higher and 150° C. or lower from the standpoint that the hydroxy group of cellulose fiber is easily reacted with the halogen-containing alcohol, and is more preferably 60° C. or higher and 120° C. or lower.

The time of the heat treatment should not particularly be limited, but is 30 minutes or more, for example.

By making a cellulose separator come into contact with a solution containing a halogen-containing alcohol, and preferably by heating it in the solution, the hydroxy group of the cellulose fiber is thought to be etherified. In other words, for example, by carrying out heat treatment in a state where a cellulose separator is immersed in a halogen-containing alcohol such as trifluoroethanol to react the hydroxy group of cellulose fiber with the hydroxy group of the halogen-containing alcohol, the halogen-containing alkyl group is thought to be added to the cellulose separator through an ether group.

Also, by the treatment using a halogen-containing alcohol as mentioned above, a halogen-containing ether group is introduced into the surface of the cellulose fiber of the cellulose separator.

As the cellulose separator, the above-mentioned separators can be used.

After heat treatment in the solution, drying treatment can appropriately be carried out.

Also, after the reaction, the solution can be removed by washing. Examples of the solvent used for washing include, for example, nonaqueous solvents such as chloroform, acetonitrile or hexane.

Examples of another embodiment of the above-mentioned production method include a method in which the etherification reaction is carried out by adding a halogen-containing alcohol to cellulose fiber and preferably by further heat treatment, and in which a nonwoven cloth is formed using the fiber obtained.

Also, using a cellulose separator treated with the above-mentioned halogen-containing carboxylic acid, it may be further treated with a halogen-containing alcohol. Likewise, using a cellulose separator treated with the halogen-containing alcohol, it may be further treated with the halogen-containing carboxylic acid.

Embodiment 4

As another embodiment, a method for producing a separator for an electric storage device, in which an inorganic material-containing separator which contains an inorganic material having a hydroxy group on a surface thereof is made to contact with a solution containing at least a halogen-containing carboxylic acid or a halogen-containing alcohol, is explained. Fluorine-containing carboxylic acids can preferably be used as the halogen-containing carboxylic acid, and fluorine-containing alcohols can preferably be used as the halogen-containing alcohol.

As the halogen-containing carboxylic acid or the halogen-containing alcohol in an exemplary embodiment of the invention, the above-mentioned compounds can be used.

The inorganic material-containing separator contains an inorganic fiber having a hydroxy group on the surface as a main component. Examples of the inorganic fiber include, for example, alumina fiber, carbon fiber or glass fiber, titanium oxide fiber and boron oxide fiber. Also, the inorganic fiber may be a fiber composed of ceramic or a fiber composed of an inorganic electrolyte material such as a lithium ion conductor. Also, among these, alumina fiber or glass fiber is preferably used. Examples of the glass fiber include, for example, microfiber wool, long fiber, and glass wool glass fiber.

Also, the inorganic material-containing separator may contain a particle composed of an inorganic material (hereinafter, also referred to as inorganic particle). Examples of the inorganic particle include, for example, alumina particle, silica particle or carbon material particle, titanium oxide particle, boron oxide particle, quartz glass particle, silicon oxide particle, calcium oxide particle, magnesium oxide particle, potassium oxide particle, sodium oxide particle, aluminum nitride particle, and silicon nitride particle. Among these, alumina particle or silica particle is preferable. For example, the inorganic particle can be fixed in an inorganic fiber using a binder. Also, the inorganic particle may be contained in an inorganic fiber.

Also, the inorganic material-containing separator may be used after surface treatment with a solution containing, for example, calcium fluoride, barium sulfate, barium fluoride, a calcium salt, a sodium salt, a magnesium salt, a potassium salt, or an amide sulfate. Note that, the inorganic material-containing separator used in this Example is a separator obtained by spraying an aqueous solution containing an amide sulfate (Sawada Chemical; Not Burn) on a glass cross obtained by weaving a glass fiber (Sawada Chemical; flame-retardant mesh) by a spray for surface treatment.

The shrinkage ratio of the inorganic material-containing separator in the case of keeping it at 200° C. or higher for 10 seconds is preferably 30% or less, and the shrinkage ratio in the case of keeping it at 300° C. for 10 seconds is more preferably 10% or less.

Also, a material obtained by mixing an alkali resistance glass fiber with mortar or concrete for reinforcement may be used as the inorganic material-containing separator.

The inorganic material-containing separator can be obtained, for example, by forming the above-mentioned inorganic fiber in a shape of sheet, film, mesh or cross. For example, an inorganic material-containing separator can be obtained by tangling the above-mentioned inorganic fiber to form a sheet or cloth by using mechanical or chemical operation. At this time, a binder may be added in order to make the inorganic fiber adhere. Also, the inorganic material-containing separator can also be obtained by weaving a twisted inorganic fiber in a shape of yarn to form a woven fabric or to form a cloth, film, sheet, mesh or cross. Examples of the inorganic material-containing separator include, for example, nonwoven cloth made from glass fiber and thin film glass cross. As the inorganic material-containing separator, woven fabric is desirable because the amount of the binder is small and a thin film with 50 μm or less is also easy to be produced. Also, the inorganic material-containing separator may be a separator which is obtained by applying an organic or inorganic binder on a knit of an inorganic fiber knitted in a shape of sheet or mesh, and then by heating it for heat treatment using a gas burner for several seconds or by drying it under vacuum at 100° C. or higher. The thermal shrinkage ratio of the knit by this heat treatment or heat drying treatment is desirably 20% or less with respect to the original size and is more desirably 5% or less.

The inorganic fiber may be used alone or in combination with two or more kinds of materials.

The inorganic material-containing separator preferably contains, as a main component, an inorganic fiber which has a hydroxy group on the surface.

Also, examples of the inorganic material-containing separator preferably include, for example, a structure in which a glass fiber is a main component and in which silica particle or alumina particle are contained.

The inorganic material-containing separator preferably contains 30 mass % or more of inorganic fiber in the constitutional components that make up the separator, more preferably contains 50 mass % or more, further preferably contains 70% or more, and particularly preferably contains 90% or more.

Also, the inorganic material-containing separator may be a separator in which the inorganic fiber is used as a main component and in which the strength of the inorganic fiber is increased by an organic or inorganic binder. The amount of the organic binder is preferably 20 mass % or less in the constitutional components that make up the inorganic material-containing separator from the standpoint of improving heat resistance, and is more preferably 10 mass % or less.

Also, the shape of the inorganic material-containing separator should not particularly be limited, but is, for example, paper, mesh or plate. Among these, in order to decrease the amount of the binder, a mesh shape obtained by weaving the inorganic fiber like a knit is preferable. Examples of the weaving method include plain weave, twill weave, sateen weave, tangle weave, mock leno weave, broken twill figured weave and double weave.

The thickness of the inorganic material-containing separator used for the production is preferably, but should not particularly be limited to, 10 μm or more and 300 μm or less, is more preferably 20 μm or more and 100 μm or less, and further desirably 50 μm or less, where it is used alone. This is because the strength in the film thickness direction is improved and the generation of an internal short-circuit is suppressed when the thickness is 10 μm or more. Also, when the thickness is 50 μm or less, the increase of internal resistance and the decrease of the discharge capacity can be suppressed. Note that, in the case where one film is laminated with another film to form a separator, the thickness of each film may be appropriately determined based on the total thickness of the films which are formed by lamination.

Also, the porosity of the inorganic material-containing separator used for the production is desirably 30% or more and 99% or less. This is because film resistance is deceased and battery performance is improved when it is 30% or more, as in the case of the average pore size. In order to further decrease the liquid resistance, the porosity is more desirably 55% or more. More preferably, the porosity is 60% or more. Also, this is because the generation of the internal short-circuit is suppressed when the porosity is 99% or less. The porosity can be calculated, for example, from the true density and the total volume of the material that is a raw material of the fine-porous film and from the weight and the volume of the fine-porous film. Further, from the stand point of suppressing the generation of the internal short-circuit, the anti-pinhole strength in the film thickness direction is desirably a certain level value or more. The anti-pinhole strength can be evaluated, for example, from the load when a metal needle (diameter 1 to 2 mm, tip r=0.5 mm) is stuck into the fine-porous film as measuring object with a constant speed by using a strength testing machines such as a texture analyzer.

One of an exemplary embodiment of the invention is a method for producing a separator for an electric storage device, in which an inorganic material-containing separator which contains an inorganic fiber having a hydroxy group on a surface thereof is made to contact with a solution containing a halogen-containing carboxylic acid or a halogen-containing alcohol. The halogen-containing carboxylic acid or the halogen-containing alcohol is preferably a fluorine-containing carboxylic acid or a fluorine-containing alcohol.

The method of the treatment of the inorganic material-containing separator using a halogen-containing carboxylic acid or a halogen-containing alcohol can be conducted by the same method as that for the above-mentioned cellulose separator. In other words, a production method according to an exemplary embodiment of the invention is also understood to be a method for producing a separator for an electric storage device, which comprising making an inorganic material-containing separator come into contact with a solution containing a halogen-containing carboxylic acid or a halogen-containing alcohol. Also, it is preferable to carry out heat treatment in a state where the inorganic material-containing separator is made to contact with the solution.

Also, the solution contains at least a halogen-containing carboxylic acid or a halogen-containing alcohol and water, but may additionally contain an acid in order to promote the reaction. Examples of the acids include, but should not particularly be limited to, for example, concentrated sulfuric acid, sulfuric acid, hydrochloric acid and phosphoric acid. The pH of the solution is preferably 1 to 8 and is more preferably 3 to 7.

In a concrete example, an inorganic material-containing separator is first immersed in 20 parts by mass of trifluoroacetic acid, and it was heated and controlled so as to be 60° C. Then, 10 parts by mass of concentrated sulfuric acid is added to trifluoroacetic acid, and heat treatment is carried out with stirring for 1 hour so that the temperature of solution becomes 60° C. After that, it was washed with a nonaqueous solvent such as chloroform.

After the reaction, the solution can be removed by washing. Examples of the solvent used for washing include, for example, nonaqueous solvents such as chloroform, acetonitrile or hexane.

Note that, the above-mentioned treatment using a halogen-containing carboxylic acid or a halogen-containing alcohol is carried out against an inorganic fiber and a separator according to an exemplary embodiment of the invention may be obtained by forming the treated inorganic fiber in a shape of cloth, sheet, mesh, film or cross.

Also, by a method in which a halogen-containing carboxylic acid or a halogen-containing alcohol is used and an acid such as concentrated sulfuric acid is added to an inorganic material-containing separator, the hydroxy group of the inorganic material-containing separator may be replaced by a halogen-containing carboxylic acid residue or a halogen-containing alcohol residue.

The separator for an electric storage device produced by the above-mentioned method is a separator in which at least a part of hydroxy group on the surface of inorganic fiber of the inorganic material-containing separator whose main component is inorganic fiber is replaced by a halogen-containing ester group or a halogen-containing ether group. The halogen-containing ester group or the halogen-containing ether group is the same as mentioned above.

Embodiment 5

As follows, a secondary battery of an exemplary embodiment of the invention is explained in detail. Note that, in the following, a lithium secondary battery is explained for an example as an embodiment of the electric storage device, but the present invention should not particularly be limited to this and it is applicable to a capacitor, for example.

A secondary battery according to an exemplary embodiment of the invention is a secondary battery which has a separator for an electric storage device of an exemplary embodiment of the invention.

An electrode assembly in which a positive electrode and a negative electrode are oppositely disposed, a separator for an electric storage device of an exemplary embodiment of the invention and an electrolyte liquid are enclosed inside a package. As for the shape of the secondary battery, cylindrical type, flattened spiral square type, stacked square type, coin type, flattened spiral laminate type and stacked laminate type can be used. Among these, the shape of the secondary battery is preferably a stacked laminate type from the standpoint that it is difficult for a tear to occur in the separator. A stacked laminate type secondary battery is explained, as follows.

FIG. 1 is a schematic cross-sectional view showing the structure of an electrode assembly in a stacked laminate type secondary battery. This electrode assembly is formed by alternately stacking plural positive electrodes c and plural negative electrodes a with separator b placed therebetween. Positive electrode collector e in each positive electrode c is electrically connected by being welded to one another at the end part thereof which is not covered with a positive electrode active substance, and further positive electrode terminal f is welded to the welded part. A negative electrode collector d in each negative electrode a is electrically connected by being welded to one another at the end part thereof which is not covered with a negative electrode active substance, and further negative electrode terminal g is welded to the welded part.

The electrode assembly having such a planar stacking structure has an advantage that it is hardly affected by volume change of the electrode that is associated with charging and discharging, in comparison with an electrode assembly having a spiral structure because no part of the electrode assembly with a planar stacking structure has a small R (an area near the spiral center of the spiral structure). That is, it is useful as an electrode assembly in which an active substance which easily generates volume change is used.

<Negative Electrode>

A lithium secondary battery of an exemplary embodiment of the invention has a negative electrode containing a negative electrode active substance. The positive electrode active substance can be bound on a positive electrode collector with a positive electrode binder.

The negative electrode active substance should not particularly be limited, but, for example, can contain metal (b) that can be alloyed with lithium, metal oxide (c) that can absorb and desorb lithium ion, and carbon material (a) that can absorb and desorb lithium ion.

Examples of the negative electrode active substance in an exemplary embodiment of the invention include, for example, but should not particularly be limited to, carbon material (a) that can absorb and desorb lithium ion, metal (b) that can be alloyed with lithium, or metal oxide (c) that can absorb and desorb lithium ion.

As carbon material (a), graphite, amorphous carbon, diamond-like carbon, carbon nanotube or a complex thereof can be used. Here, graphite having high crystallinity has high electroconductivity and excellent adhesiveness with a positive electrode collector that is made of metal such as copper or the like as well as excellent voltage flatness. On the other hand, since amorphous carbon having low crystallinity has relatively low volume expansion, this has the significant effect of reducing the volume expansion of the entire negative electrode, and deterioration due to ununiformity such as a crystal grain boundary or a defect hardly occurs.

Examples of metal (b) include, for example, Al, Si, Pb, Sn, In, Bi, Ag, Ba, Ca, Hg, Pd, Pt, Te, Zn, La, or an alloy of two or more kinds of these metals. Also, this metal or alloy may be used in combination with two or more kinds of materials. Also, this metal or alloy may contain one or more non-metal element. In an exemplary embodiment of the invention, it is preferable to contain tin or silicone as a negative electrode active substance, and is more preferable to contain silicone. The reason for this is because it is difficult for a reaction to occur between the phosphoric acid residue that is contained in the cellulose for an electric storage device of the exemplary embodiment of the invention and tin and silicone, and thus an increase of irreversible capacity can be suppressed.

Examples of metal oxide (c) include, for example, silicon oxide, aluminum oxide, tin oxide, indium oxide, zinc oxide, lithium oxide or a complex thereof. In an exemplary embodiment of the invention, it is preferable to contain tin oxide or silicon oxide as a negative electrode active substance, and is more preferable to contain silicon oxide. The reason for this is because silicon oxide is relatively stable and this makes it difficult for a reaction to occur with another chemical compound. Also, one element or two or more elements selected from nitrogen, boron and sulfur can be added as metal oxide (c), for example, in the amount of 0.1 to 5 mass %. In this way, the electroconductivity of metal oxide (c) can be improved.

As for metal oxide (c), all or a part thereof preferably has an amorphous structure. Metal oxide (c) having an amorphous structure can suppress the volume expansion of carbon material (a) or metal (b) that is another negative electrode active substance. Although this mechanism is not clear, the amorphous structure of metal oxide (c) is assumed to have some influence on coating formation at the interface between carbon material (a) and the electrolyte liquid. Also, it is assumed that the amorphous structure has a relatively small constituent due to ununiformity such as a crystal grain boundary or a defect. Note that, X-ray diffraction measurement (general XRD measurement) can confirm that all or a part of metal oxide (c) has an amorphous structure. Specifically, in the case where metal oxide (c) does not have an amorphous structure, a peak peculiar to metal oxide (c) is observed, while in the case where all or a part of metal oxide (c) has an amorphous structure, the observed peak peculiar to metal oxide (c) becomes to be broad.

The negative electrode active substance in an exemplary embodiment of the invention preferably contains carbon material (a) that can absorb and desorb lithium ion, metal (b) that can be alloyed with lithium, and metal oxide (c) that can absorb and desorb lithium ion. Also, metal (b) is preferably silicone, and metal oxide (c) is preferably silicone oxide. In other words, the negative electrode active substance preferably comprises a complex of silicone, silicone oxide and carbon material (hereinafter, also referred to as Si/SiO/C complex).

Also, a negative electrode active substance which has been previously doped with lithium chemically or thermally, can be used. For example, regarding thermal doping method, the negative electrode active substance is brought into contact with lithium metal and the entire electrode is heated to enable doping lithium to the negative electrode active substance.

In the Si/SiO/C complex, all or a part of silicon is dispersed in silicon oxide. The dispersion of at least a part of silicon in silicon oxide can suppress the volume expansion of the negative electrode as a whole and can also suppress decomposition of an electrolyte liquid. Note that, it can be confirmed by transmission electron microscope observation (general TEM observation) together with energy dispersive X-ray spectroscopy measurement (general EDX measurement) that all or a part of silicon is dispersed in silicon oxide. Specifically, a section of a specimen containing silicon particle is observed and oxygen atom concentration of silicon particles which are dispersed in silicon oxide is measured, and thereby it can be confirmed that it does not become an oxide.

In the Si/SiO/C complex, for example, all or a part of silicon oxide has an amorphous structure and all or a part of silicon is dispersed in silicon oxide. This Si/SiO/C complex can be produced, for example, by the method disclosed in Patent Document 3 (JP 2004-47404 A). That is, CVD processing of silicon oxide is carried out in an atmosphere containing organic substance gas such as methane gas, to obtain the Si/SiO/C complex. In the Si/SiO/C complex obtained by this method, the surface of the particle which consists of silicon oxide containing silicon is covered with carbon. Also, silicon becomes a nanocluster in silicon oxide.

In the Si/SiO/C complex, the ratio of carbon material, silicone and silicone oxide should not particularly be limited. The content of carbon material is preferably 2 mass % or more and 50 mass % or less with respect to the Si/SiO/C complex, and is more preferably 2 mass % or more and 30 mass % or less. The content of silicon is preferably 5 mass % or more and 90 mass % or less with respect to the Si/SiO/C complex, and is more preferably 20 mass % or more and 50 mass % or less. The content of silicon oxide is preferably 5 mass % or more and 90 mass % or less with respect to the Si/SiO/C complex, and is more preferably 40 mass % or more and 70 mass % or less.

Also, the Si/SiO/C complex can comprise a mixture of carbon material, silicon and silicon oxide. For example, the Si/SiO/C complex can be obtained by mixing each particle of carbon material, silicon and silicon oxide. For example, the average particle diameter of silicon can be constituted in a range smaller than the average particle diameter of carbon material and the average particle diameter of silicon oxide. By this structure, since silicon, in which the volume change associated with charge and discharge is small, has a relatively small particle diameter, and since carbon material and silicon oxide, in which the volume change is large, has a relatively large particle diameter, dendrite generation and the pulverization of alloy are more effectively suppressed. Also, in the process of charge and discharge, lithium is absorbed and desorbed from the larger diameter particle, the smaller diameter particle and the larger diameter particle in this order. From this point, the residual stress and the residual strain are suppressed. The average particle diameter of silicon can be, for example, 20 μm or less, and is preferably 15 μm or less.

The negative electrode binder should not particularly be limited, but, for example, polyvinylidene fluorides, vinylidene fluoride-hexafluoropropylene copolymers, vinylidene fluoride-tetrafluoroethylene copolymers, styrene-butadiene rubbers, polytetrafluoroethylenes, polypropylenes, polyethylenes, polyimides, polyamide-imides and polyacrylic acids can be used. Among these, a polyimide or a polyamide-imide is preferable because it has a strong binding property. The amount of the negative electrode binder used is preferably 5 to 25 parts by mass with respect to 100 parts by mass of the negative electrode active substance from the standpoint of "sufficient binding force" and "high energy" which are trade-offs.

As the negative electrode collector, aluminum, nickel, stainless steel, chromium, copper, silver and alloys thereof are preferable from the standpoint of electrochemical stability. Examples of the shape thereof include foil, flat plate and mesh.

A negative electrode can be produced by forming a negative electrode active substance layer containing a negative electrode active substance and a negative electrode binder on a negative electrode collector. Examples of the method of forming the negative electrode active substance layer include doctor blade method, die coater method, CVD method, and sputtering method. A negative electrode active substance layer may first be formed, and a thin film of aluminum, nickel or an alloy thereof may thereafter be formed by vapor deposition, sputtering or the like to obtain the negative electrode.

<Positive Electrode>

For example, the positive electrode is formed by binding a positive electrode active substance on a positive electrode collector with a positive electrode binder so that the positive electrode active substance covers the positive electrode collector.

Examples of the positive electrode active substance include lithium manganates having a layered conformation or lithium manganates having a Spinel conformation such as $LiMnO_2$, $Li_xMn_2O_4$ ($0<x<2$), $Li_2MnO_3$ and $Li_xMn_{1.5}Ni_{0.5}O_4$ ($0<x<2$); $LiCoO_2$, $LiNiO_2$ and compounds in which a part of the transition metal thereof are substituted by another metal; lithium transition metal oxides such as $LiNi_{1/3}Co_{1/3}Mn_{1/3}O_2$ in which the molar ratio of a particular transition metal is not more than a half; compounds which have a larger amount of Li than the stoichiometric amount in these lithium transition metal oxides; and compounds which has an Olivine conformation such as $LiFePO_4$. Also, materials obtained by substituting a part of these metal oxides by Al, Fe, P, Ti, Si, Pb, Sn, In, Bi, Ag, Ba, Ca, Hg, Pd, Pt, Te, Zn, La or the like can be used. In particular, $Li_\alpha Ni_\beta Co_\gamma Al_\delta O_2$ ($1\leq\alpha\leq2$, $\beta+\gamma+\delta=1$, $\beta\geq0.7$, and $\gamma\leq0.2$) or $Li_\alpha Ni_\beta Co_\gamma Mn_\delta O_2$ ($1\leq\alpha\leq1.2$, $\beta+\gamma+\delta=1$, $\beta\geq0.6$, and $\gamma\leq0.2$) is preferable. The positive electrode active substance can be used alone, or in combination with two or more kinds of materials.

In addition, radical materials and the like can also be used as the positive electrode active substance.

As a positive electrode binder, the same materials for a negative electrode binder can be used. Among these, from the standpoint of versatility and low cost, polyvinylidene fluorides are preferable. The amount of the positive electrode binder used is preferably 2 to 15 parts by mass with respect to 100 parts by mass of the positive electrode active substance from the standpoint of "sufficient binding force" and "high energy" which are trade-offs.

As a positive electrode collector, the same materials for a positive electrode collector can be used.

For the purpose of decreasing impedance, an electroconductive auxiliary material may be added to a positive electrode active substance layer containing a positive electrode active substance. Examples of the electroconductive auxiliary material include carbonaceous fine particles such as graphite, carbon black, and acetylene black.

<Electrolyte Liquid>

An electrolyte liquid used in an exemplary embodiment of the invention should not particularly be limited, but contains a supporting salt and a nonaqueous electrolyte solvent, for example.

Examples of the nonaqueous electrolyte solvent include, but should not particularly be limited to, for example, nonprotic organic solvents such as: cyclic-type carbonates such as ethylene carbonate (EC), propylene carbonate (PC), butylene carbonate (BC), vinylene carbonate (VC), and vinylethylene carbonate (VEC); linear-type carbonates such as dimethyl carbonate (DMC), diethyl carbonate (DEC), ethyl methyl carbonate (EMC), and dipropyl carbonate (DPC); propylene carbonate derivatives; and aliphatic carboxylates such as methyl formate, methyl acetate, and ethyl propionate. As the nonaqueous electrolyte solvent, cyclic-type or linear-type carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and dipropyl carbonate (DPC) are preferable. The nonaqueous electrolyte solvent can be used alone, or in combination with two or more kinds of electrolyte solvents.

Also, examples of the nonaqueous electrolyte solvent additionally include, for example, ethylene sulfite (ES), propane sultone (PS), butane sultone (BS), Dioxathiolane-2,2-dioxide (DD), sulfolene, 3-methyl sulfolene, sulfolane (SL), succinic anhydride (SUCAH), propionic anhydride, acetic anhydride, maleic anhydride, diallyl carbonate (DAC), diphenyl disulfide (DPS), dimethoxyethane (DME), dimethoxymethane (DMM), diethoxyethane (DEE), ethoxymethoxyethane, dimethyl ether, methyl ethyl ether, methyl propyl ether, ethyl propyl ether, dipropyl ether, methyl butyl ether, diethyl ether, phenyl methyl ether, tetrahydrofuran (THF), tetrahydropyran (THP), 1,4-dioxane (DIOX), 1,3-dioxolane (DOL), acetonitrile, propionitrile, γ-butyrolactone and γ-valerolactone.

Also, in an exemplary embodiment of the invention, the nonaqueous electrolyte solvent preferably contains a fluorinated carbonate.

The fluorinated carbonate includes cyclic-type and linear-type, and specific examples thereof include fluorinated cyclic-type carbonates and fluorinated linear-type carbonates. Also, it is preferably a fluorinated cyclic-type carbonate.

The fluorinated cyclic-type carbonate should not particularly be limited, but compounds in which a part of ethylene carbonate, propylene carbonate, vinylene carbonate or vinylethylene carbonate is substituted by fluorine can be used. More specifically, for example, 4-fluoro-1,3-dioxolane-2-one (fluoroethylene carbonate, hereinafter, also referred to as FEC), (cis- or trans-) 4,5-difluoro-1,3-dioxolane-2-on, 4,4-difluoro-1,3-dioxolane-2-one and 4-fluoro-5-methyl-1,3-dioxolane-2-one can be used. Among these, fluoroethylene carbonate is preferable.

Also, examples of the fluorinated carbonate include compounds overlapping with the above-mentioned description, but preferably include a compound represented by following formula (6):

formula (6)

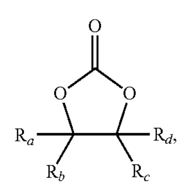

Wherein, in formula (6), $R_a$, $R_b$, $R_c$ and $R_d$ are each independently hydrogen atom, fluorine atom or a fluorine-containing alkyl group, and at least one of $R_a$, $R_b$, $R_c$ and $R_d$ is fluorine atom or a fluorine-containing alkyl group.

The fluorine-containing alkyl group has at least one fluorine atom, and is preferably in a state where all hydrogen atoms of the alkyl group are substituted by fluorine atom. Also, the fluorine-containing alkyl group includes straight-chain type or branched-chain type, and preferably has a carbon number of 1 to 5.

The fluorinated linear-type carbonate should not particularly be limited, but compounds in which a part or all hydrogen of dimethyl carbonate, diethyl carbonate, ethyl methyl carbonate, dipropyl carbonate or methyl propyl carbonate is substituted by fluorine can be used. More specific examples thereof include, for example, bis(fluoroethyl) carbonate, 3-fluoropropyl methyl carbonate and 3,3,3-trifluoropropyl methyl carbonate.

Also, examples of the fluorinated linear-type carbonate include compounds overlapping with the above-mentioned description, but preferably include a compound represented by following formula (7):

formula (7)

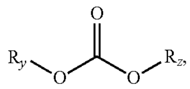

Wherein, in formula (7), $R_y$ and $R_z$ are each independently hydrogen atom or a fluorine-containing alkyl group, and at least one of $R_y$ and $R_z$ is a fluorine-containing alkyl group.

The fluorine-containing alkyl group has at least one fluorine atom, and is preferably in a state where all hydrogen atoms of the alkyl group are substituted by fluorine atom. Also, the fluorine-containing alkyl group includes straight-chain type or branched-chain type, and preferably has a carbon number of 1 to 5.

The content of the fluorinated carbonate is preferably 0.01 mass % or more and 50 mass % or less in the nonaqueous electrolyte solvent. When a fluorinated carbonate is contained in an electrolyte liquid, the discharge capacity becomes large, but when there is too much fluorinated carbonate, the tendency is for the viscosity in the electrolyte liquid to become high, which leads to an increase of the resistance. Therefore, the content of the fluorinated carbonate is preferably 0.1 mass % or more and 30 mass % or less in the electrolyte liquid, and is more preferably 1 mass % or more and 10 mass % or less.

The fluorinated carbonate includes cyclic-type and linear-type. The nonaqueous electrolyte solvent preferably contains a carbonate other than fluorinated carbonates (hereinafter, also referred to as non-fluorinated carbonate) and a fluorinated carbonate. By using a non-fluorinated carbonate, the ion dissociation of the electrolyte liquid is improved, and the viscosity of the electrolyte liquid is also decreased. Therefore, ion mobility can be improved. The non-fluorinated carbonate includes cyclic-type and linear-type (non-fluorinated) as mentioned above. In this case, the nonaqueous electrolyte solvent preferably contains a non-fluorinated carbonate as a main solvent, and more preferably contains 70 to 99.9 mass % of a non-fluorinated carbonate and 0.1 to 15 mass % of a fluorinated carbonate.

Also, the nonaqueous electrolyte solvent preferably contains a phosphate compound as a main solvent, and the nonaqueous electrolyte solvent more preferably contains 70 to 99.9 mass % of a phosphate compound and 0.1 to 15 mass % of a fluorinated carbonate. Also, the content of the phosphate compound in the nonaqueous electrolyte solvent is more preferably 85 to 99 mass %, and is further preferably 90 to 98 mass %. The content of the fluorinated carbonate compound in the nonaqueous electrolyte solvent is more preferably 0.2 to 13 mass %, and is further preferably 1 to 10 vol %. By using a nonaqueous electrolyte solvent containing a phosphate compound and a fluorinated carbonate, the cycle property and the flame retardancy of the secondary battery can further be improved.

Examples of the phosphate compound include, for example, a compound represented by following formula (8):

formula (8)

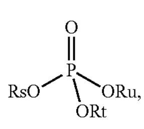

Wherein, in formula (8), Rs, Rt and Ru are each independently an alkyl group, an alkenyl group, an aryl or a cycloalkyl group which are substituted or non-substituted, and, any two or all of Rs, Rt and Ru may be connected to form a cyclic structure.

The alkyl group is preferably an alkyl group with a total carbon number of 1 to 18, is more preferably an alkyl group with a total carbon number of 1 to 12, and is further preferably an alkyl group with a total carbon number of 1 to 6. Also, the alkyl group includes straight-chain type alkyl groups, branched-chain type alkyl groups or cyclic-chain type alkyl groups. The aryl group is preferably an aryl group with a total carbon number of 6 to 18, is more preferably an aryl group with a total carbon number of 6 to 12, and is further preferably an aryl group with a total carbon number of 6 to 10. The alkenyl group is preferably an alkenyl group with a total carbon number of 2 to 18, is more preferably an alkenyl group with a total carbon number of 2 to 12, and is further preferably an alkenyl group with a total carbon number of 2 to 6. Examples of the substituent preferably include halogen atoms. Examples of the halogen atom include, for example, chlorine atom, fluorine atom or bromine atom.

Specific examples of the phosphate compound include alkyl phosphate compounds such as trimethyl phosphate, triethyl phosphate, tripropyl phosphate, tributyl phosphate, tripentyl phosphate, trihexyl phosphate, triheptyl phosphate, trioctyl phosphate, dimethylethyl phosphate, dimethylmethyl phosphate (DMMP), dimethylethyl phosphate and diethylmethyl phosphate; aryl phosphate compounds such as triphenyl phosphate; phosphate compounds having a cyclic-type structure such as methylethylene phosphate, ethylethylene phosphate (EEP) and ethylbutylene phosphate; halogenated alkyl phosphate compounds such as tris(trifluoromethyl) phosphate, tris(pentafluoroethyl) phosphate, tris(2,2,2-trifluoroethyl) phosphate, tris(2,2,3,3-tetrafluoropropyl) phosphate, tris (3,3,3-trifluoropropyl) phosphate and tris(2,2,3,3,3-pentafluoropropyl) phosphate. Among these, it is preferable to use a trialkyl phosphate compound such as trimethyl phosphate, triethyl phosphate, tripropyl phosphate, tributyl phosphate, tripentyl phosphate, trihexyl phosphate, triheptyl phosphate or trioctyl phosphate, as the phosphate compound. The phosphate compound can be used alone, or in combination with two or more kinds of materials.

Also, a fluorinated ether having an $R_{v1}$—O—$R_{v2}$ structure ($R_{v1}$ and $R_{v2}$ are respectively an alkyl group or a fluorine alkyl group), an ionic liquid, a phosphazene or the like can be mixed with the electrolyte liquid.

Examples of the supporting salt include, but should not particularly be limited to, for example, $LiPF_6$, LiI, LiBr, LiCl, $LiAsF_6$, $LiAlCl_4$, $LiClO_4$, $LiBF_4$, $LiSbF_6$, $LiCF_3SO_3$, $LiC_4F_9SO_3$, $LiN(FSO_2)_2$, $LiN(CF_3SO_2)_2$, $LiN(C_2F_5SO_2)_2$, $LiN(CF_3SO_2)(C_2F_5SO_2)$, $LiN(CF_3SO_2)(C_4F_9SO_2)$, and cyclic-type $LiN(CF_2SO_2)_2$ and $LiN(CF_2SO_2)_2(CF_2)$. Also, examples of the supporting salt additionally include, for example, $LiPF_5(CF_3)$, $LiPF_5(C_2F_5)$, $LiPF_5(C_3F_7)$, $LiPF_4(CF_3)_2$, $LiPF_4(CF_3)(C_2F_5)$ and $LiPF_3(CF_3)_3$, in which at least one fluorine atom of $LiPF_6$ is replaced by a fluorinated alkyl group.

Also, examples of the lithium salt include a salt consisting of the compound represented by formula (9):

formula (9)

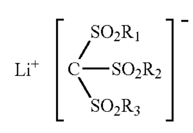

wherein, in formula (9), $R_1$, $R_2$ and $R_3$ are selected from the group consisting of halogen atoms and fluorinated alkyl groups, and may be different from each other or may be the same. Examples of the compound represented by formula (9) include $LiC(CF_3SO_2)_3$ and $LiC(C_2F_5SO_2)_3$.

The supporting salt can be used alone, or in combination with two or more kinds of materials.

The concentration of the lithium salt is, but should not particularly be limited to, for example, 0.01M (mol/L) or more and 3 M (mol/L) or less in the electrolyte liquid. Also, the concentration of the lithium salt is preferably 0.5 M (mol/L) or more and 1.5 M (mol/L) or less in the electrolyte liquid.

Desirably, the amount of the electrolyte liquid is appropriately adjusted based on the porosities of the positive electrode, the negative electrode and the separator. When the total of the porosity volumes of the positive electrode, the negative electrode and the separator is 1.0, the amount of the electrolyte liquid is preferably 0.2 or more and 2.0 or less and is more preferably 0.5 or more and 1.5 or less. Also, from the standpoint of making it easier to suppress the gas generation at high temperature, the amount of the electrolyte liquid is further preferably 1.2 or less and is particularly preferably 1.0 or less.

<Package>

The package can appropriately be selected as long as it has stability against the electrolyte liquid and has sufficient moisture barrier property. For example, in the case of the stacked laminate type secondary battery, a laminate film of a polypropylene, polyethylene or the like which is coated with aluminum or silica can be used as the package. In particular, an aluminum laminate film is preferably used from a viewpoint of suppressing volume expansion.

A separator for an electric storage device of the present reference embodiment can preferably be applied to the structure of a secondary battery explained in the above-mentioned embodiment. Note that, it can be applied to a capacitor, for example.

Embodiment 6

As follows, one of a preferred embodiment of an electric storage device of an exemplary embodiment of the invention is explained below.

One of an exemplary embodiment of the invention is an electric storage device, comprising at least a negative electrode containing a negative electrode active substance, an electrolyte liquid containing a nonaqueous electrolyte solvent and a separator;

wherein the negative electrode active substance contains at least one of metal (b) that can be alloyed with lithium and metal oxide (c) that can absorb and desorb lithium ion; and wherein the separator is an inorganic material-containing separator whose main component is an inorganic fiber.

Metal (b) is preferably silicon. Also, Metal oxide (c) is preferably silicon oxide. Also, the negative electrode active substance preferably comprises a complex of silicon, silicon oxide and carbon material (hereinafter, also referred to as Si/SiO/C complex).

In the embodiment, the nonaqueous electrolyte solvent preferably contains the above-mentioned phosphate compound as a main solvent. The content of the phosphate compound in the nonaqueous electrolyte solvent is, for example 60 mass % or more, is preferably 70 mass % or more, is more preferably 80 mass % or more, and is further preferably 90 mass % or more.

Also, the nonaqueous electrolyte solvent more preferably contains 70 to 99.9 mass % of a phosphate compound and 0.1 to 15 mass % of the above-mentioned fluorinated carbonate. Also, the content of the phosphate compound in the nonaqueous electrolyte solvent is more preferably 85 to 99 mass %, and is further preferably 90 to 98 mass %. The content of the fluorinated carbonate compound in the nonaqueous electrolyte solvent is more preferably 0.2 to 13 mass %, and is further preferably 1 to 10 vol %. By using a nonaqueous electrolyte solvent containing a phosphate compound and a fluorinated carbonate, the cycle property and the flame retardancy of the secondary battery can further be improved.

As the inorganic material-containing separator, the above-mentioned separators can be used.

EXAMPLES

As follows, an exemplary embodiment of the invention is more concretely explained by the Examples.

Production Example 1

Production Method of Fluorine-Containing Alcohol Cellulose Separator

A cellulose separator (produced by NIPPON KODOSHI CORPORATION, thickness; 25 μm, nonwoven cloth: porosity 71%, TF4425) was immersed in trifluoroethanol, and was kept for 1 hour at 60° C. Then, it was heated to 80° C. After trifluoroethanol was sufficiently evaporated, the separator was taken out and was dried overnight at 130° C. The thermal stability test of the separator dried (hereinafter, also referred to as fluorine-containing alcohol cellulose separator) was evaluated as shown below.

Figure 2:
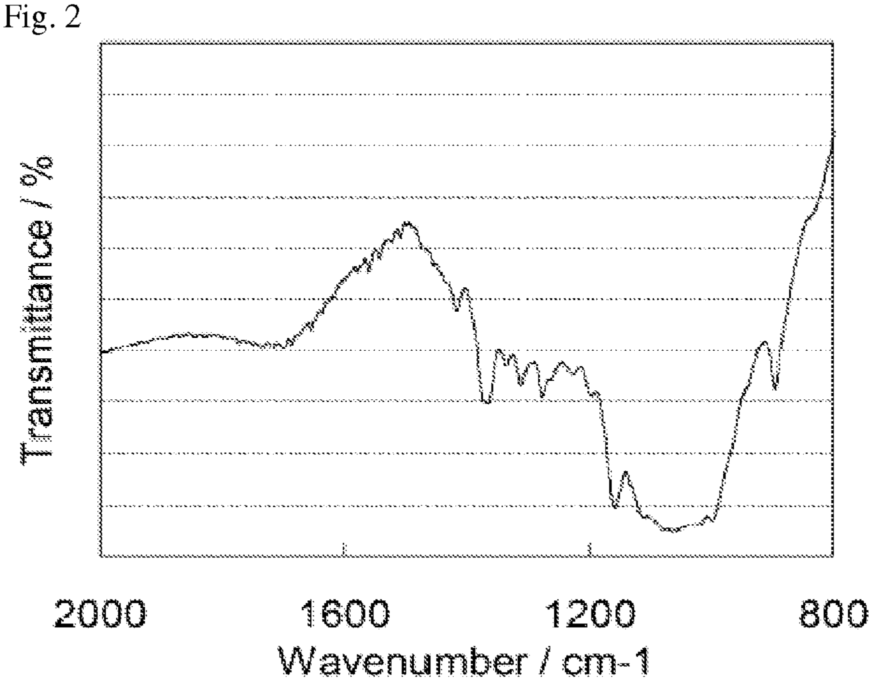
FIG. 2 shows the IR spectrum of the fluorine-containing alcohol cellulose separator in Production Example 2.
Figure 3:
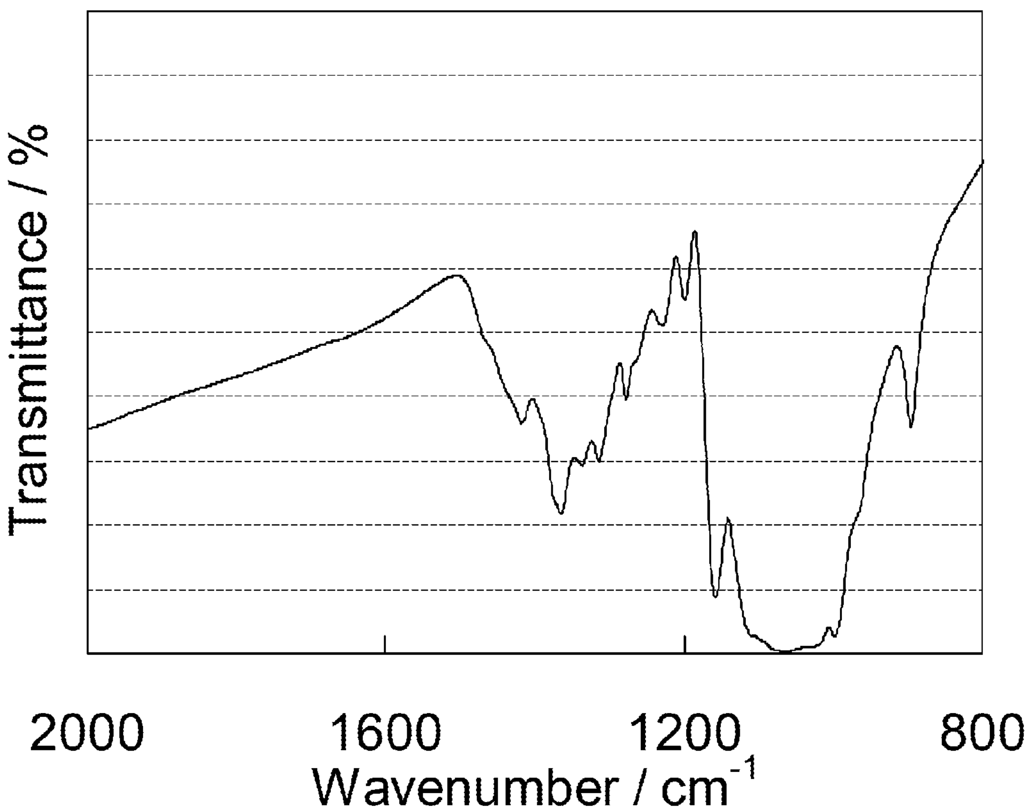
FIG. 3 shows the IR spectrum of the cellulose separator before the treatment.

Also, the fluorine-containing alcohol cellulose separator was washed with chloroform and was sufficiently vacuum-dried, and it was then measured by IR. The IR spectrum is shown in FIG. 2. As the comparison, the IR spectrum of the cellulose separator before the fluorine-containing alcohol treatment is shown in FIG. 3. The IR measurement was carried out by transmission measurement using an apparatus manufactured by JASCO Corporation under the conditions of the resolution of 4 $cm^{-1}$ and the scan time of 500 times.

In the fluorine-containing alcohol cellulose separator (FIG. 2), peaks were detected at 1200 $cm^{-1}$ and 1235 $cm^{-1}$, compared with the IR spectrum (FIG. 3) of the cellulose separator. These peaks can be assigned to C—F stretching vibration and C—O stretching. Since these peaks are inherent peaks, it can be recognized that the hydroxy group of the cellulose is etherified.

Production Example 2

Production Method of Fluorine-Containing Carboxylic Acid Cellulose Separator A cellulose separator (produced by NIPPON KODOSHI CORPORATION, thickness; 25 μm, nonwoven cloth: porosity 71%, TF4425) was immersed in trifluoroacetic anhydride, and was kept for 2 hours at 30° C. Then, it was heat-treated at 80° C. After trifluoroacetic anhydride was sufficiently evaporated, the separator was taken out and was dried overnight at 130° C. The thermal stability test of the separator dried (hereinafter, also abbreviated to fluorine-containing carboxylic acid cellulose separator) was evaluated as shown below.

Production Example 3

Production Method of Fluorine-Containing Carboxylic Acid Inorganic Material-Containing Separator An inorganic material-containing separator (produced by Sawada Chemical, thickness 32 μm, mesh type) was immersed in 20 parts by mass of trifluoroacetic anhydride, and was then kept for 2 hours at 30° C. Then, it was heat-treated at 80° C. After trifluoroacetic anhydride was sufficiently evaporated, the separator was taken out and was dried overnight at 130° C. The thermal stability test of the separator dried (hereinafter, also abbreviated to fluorine-containing carboxylic acid inorganic material separator) was evaluated as shown below.

Production Example 4

Production Method of Fluorine-Containing Alcohol Inorganic Material-Containing Separator An inorganic material-containing separator (produced by Sawada Chemical, thickness 32 μm, mesh type) was immersed in trifluoroethanol, and was then kept for 1 hour at 60° C. Then, it was heated to 80° C. After trifluoroethanol was sufficiently evaporated, the separator was taken out and was dried overnight at 130° C. The thermal stability test of the separator dried (hereinafter, also abbreviated to fluorine-containing alcohol inorganic material separator) was evaluated as shown below.

(Thermal Stability Test of Separator)

At first, the thermal stability tests of the fluorine-containing carboxylic acid cellulose separator, the fluorine-containing alcohol cellulose separator, the fluorine-containing carboxylic acid inorganic material separator and the fluorine-containing alcohol inorganic material separator which were produced were carried out by the following method.

Each separator was placed on a heater warmed to 120° C., and after 1 hour the area was measured. And, the thermal shrinkage ratio was calculated from the area values before and after the separator was placed in a high-temperature environment, and the results are shown in TABLE 1.

Also, as a Reference Example, the thermal stability test of a separator composed of a polyethylene (produced by Celgard, LLC, film thickness; 23 μm, porosity 50%) was carried out in the same manner and the thermal shrinkage ratio was calculated.

The thermal shrinkage ratio is defined by (thermal shrinkage ratio)=[(area before heating of separator)−(area after heating of separator)]/(area before heating of separator)× 100].

TABLE 1

| | type of separator | thermal shrinkage ratio (%) |
|---|---|---|
| Prod. Ex. 1 | fluorine-containing alcohol cellulose separator | 1 |
| Prod. Ex. 2 | fluorine-containing carboxylic acid cellulose separator | 1 |
| Prod. Ex. 3 | fluorine-containing carboxylic acid inorganic material separator | 0 |
| Prod. Ex. 4 | fluorine-containing alcohol inorganic material separator | 0 |
| Ref. Ex. 1 | polyethylene separator | 36 |

It is found that the fluorine-containing carboxylic acid cellulose separator and the fluorine-containing alcohol cellulose separator have a smaller thermal shrinkage ratio in high-temperature environment and higher thermal stability in comparison with the polyethylene separator.

From the above-mentioned results, it is found that the use of a fluorine-containing carboxylic acid cellulose separator or a fluorine-containing alcohol cellulose separator which have high thermal stability can suppress the increase in the size of are where short-circuit occurs due to thermal shrinkage when abnormal heat is generated in a battery.

It is found that the same effects as these effects observed in the fluorine-containing carboxylic acid cellulose separator or the fluorine-containing alcohol cellulose separator are also obtained in the fluorine-containing carboxylic acid inorganic material separator and the fluorine-containing alcohol inorganic material separator.

Example 1

Performance Evaluation of Secondary Battery

Next, a secondary battery was produced using a fluorine-containing carboxylic acid cellulose separator.

CVD treatment was carried out in an atmosphere containing methane gas at 1150° C. for 6 hours to obtain silicon/silicon oxide/carbon complex (hereinafter, also referred to as Si/SiO/C complex). The Si/SiO/C complex had the structure in which the surface of the particle that consisting of silicon and silicon oxide was coated with carbon. Also, silicon was in the state of a nanocluster in silicon oxide. Also, the mass ratio of Si/SiO/C was adjusted so as to become approximately 29/61/10.

The above-mentioned negative electrode active substance (average particle diameter $D_{50}$=5 μm) and a polyimide (produced by UBE INDUSTRIES, trade name: U varnish A) as a negative electrode binder were weighed at a mass ratio of 90:10, and they were mixed with n-methylpyrrolidone to prepare a negative electrode slurry. The negative electrode slurry was applied on a copper foil having a thickness of 10 μm and was then dried, and it was further heat-treated in nitrogen atmosphere at 300° C. to produce a negative electrode.

A lithium nickelate ($LiNi_{0.80}Co_{0.5}Al_{0.15}O_2$) as a positive electrode active substance, carbon black as an electroconductive auxiliary material, and a polyvinylidene fluoride as a positive electrode binder were weighed at a mass ratio of 90:5:5, and they were mixed with n-methylpyrrolidone to prepare a positive electrode slurry. The positive electrode slurry was applied on an aluminum foil having a thickness of 20 μm and was then dried, and it was further pressed to produce a positive electrode.

3 layers of the obtained positive electrode and 4 layers of the obtained negative electrode were alternately stacked with the above-mentioned fluorine-containing carboxylic acid cellulose separator placed therebetween. End parts of the positive electrode collectors which were not covered with the positive electrode active substance and end parts of the negative electrodes collectors which were not covered with the negative electrode active substance were respectively welded. Further, an aluminum positive electrode lead terminal and a nickel negative electrode lead terminal were respectively welded thereto, to obtain an electrode assembly which had a planar stacking structure.

Also, a liquid obtained by dissolving $LiPF_6$ as the supporting salt in a concentration of 1 mol/L in a nonaqueous electrolyte solvent consisting of EC:DEC (30:70) was used as the electrolyte liquid.

The above-mentioned electrode assembly was enclosed in an aluminum lamination film as a package and the electrolyte liquid was poured thereinto, and it was then sealed with depressurization to 0.1 atm to produce a secondary battery.

The first discharge capacity of the secondary battery produced as mentioned above was measured. The conditions of the first charge and discharge were set to be a current of 0.2 C, an environment of 20° C., an upper limit of 4.2 V and a lower limit of 2.5 V. The discharge capacity measured is shown in TABLE 2.

Next, an aluminum laminate cell was produced by placing 1 layer of the positive electrode and 1 layer of the negative electrode through a fluorine-containing carboxylic acid cellulose separator, and by pouring an electrolyte liquid. The conditioning of the cell produced was carried out, and it was then charged to the upper limit voltage of 4.3 V at a current of 0.2 C. A weight having a weight of 5 kg was dropped from the height of 50 cm over the cell in a charged state to make an impact on the cell. After the impact was made to the cell, the temperature of the cell was measured by a thermocouple attached outside of the cell. The amount of temperature increase in the cell was calculated from the maximum temperature after the impact test and the cell temperature before the impact test, and it is shown in TABLE 2.

Example 2

A secondary battery and a cell were produced in the same manner as Example 1 except that a solvent obtained by mixing 5 mass % of fluoroethylene carbonate with EC:DEC (30:70) was used as the nonaqueous electrolyte solvent, and were evaluated.

Example 3

A secondary battery and a cell were produced in the same manner as Example 1 except that a solvent obtained by mixing 2 mass % of fluoroethylene carbonate with TEP (triethyl phosphate) was used as the nonaqueous electrolyte solvent, and were evaluated.

Example 4

A secondary battery and a cell were produced in the same manner as Example 1 except that a solvent obtained by mixing 5 mass % of fluoroethylene carbonate with TEP (triethyl phosphate) was used as the nonaqueous electrolyte solvent, and were evaluated.

Example 5

A secondary battery and a cell were produced in the same manner as Example 1 except that a solvent obtained by mixing 10 mass % of fluoroethylene carbonate with TEP (triethyl phosphate) was used as the nonaqueous electrolyte solvent, and were evaluated.

Example 6

A secondary battery and a cell were produced in the same manner as Example 1 except that the above-mentioned fluorine-containing alcohol cellulose separator was used instead of the fluorine-containing carboxylic acid cellulose separator, and were evaluated.

Example 7

A secondary battery and a cell were produced in the same manner as Example 6 except that a solvent obtained by mixing 5 mass % of fluoroethylene carbonate with EC:DEC (30:70) was used as the nonaqueous electrolyte solvent, and were evaluated.

Example 8

A secondary battery and a cell were produced in the same manner as Example 6 except that a solvent obtained by mixing 2 mass % of fluoroethylene carbonate with TEP (triethyl phosphate) was used as the nonaqueous electrolyte solvent, and were evaluated.

Example 9

A secondary battery and a cell were produced in the same manner as Example 6 except that a solvent obtained by mixing 5 mass % of fluoroethylene carbonate with TEP (triethyl phosphate) was used as the nonaqueous electrolyte solvent, and were evaluated.

Example 10

A secondary battery and a cell were produced in the same manner as Example 6 except that a solvent obtained by mixing 10 mass % of fluoroethylene carbonate with TEP (triethyl phosphate) was used as the nonaqueous electrolyte solvent, and were evaluated.

Example 11

A secondary battery and a cell were produced in the same manner as Example 3 except that the fluorine-containing carboxylic acid inorganic material separator treated as mentioned above was used instead of the fluorine-containing carboxylic acid cellulose separator, and were evaluated.

Example 12

A secondary battery and a cell were produced in the same manner as Example 11 except that the fluorine-containing alcohol inorganic material separator treated as mentioned above was used instead of the fluorine-containing carboxylic acid inorganic material separator, and were evaluated.

Example 13

A secondary battery and a cell were produced in the same manner as Example 11 except that an inorganic material-containing separator (a separator before the treatment with a fluorine-containing carboxylic acid) was used instead of the fluorine-containing carboxylic acid inorganic material separator, and were evaluated.

Comparative Example 1

A secondary battery and a cell were produced in the same manner as Example 1 except that the above-mentioned cellulose separator was used instead of the fluorine-containing carboxylic acid cellulose separator, and were evaluated.

TABLE 2

| | Separator | nonaqueous electrolyte solvent main solvent | content (%) | fluorinated carbonate | content (%) | first discharge capacity (mAh) | the amount of temperature increase in the cell (° C.) |
|---|---|---|---|---|---|---|---|
| Ex. 1 | fluorine-containing carboxylic acid cellulose separator | EC/DEC | 100 | — | — | 1574 | 6 |
| Ex. 2 | fluorine-containing carboxylic acid cellulose separator | EC/DEC | 95 | FEC | 5 | 1606 | 6 |
| Ex. 3 | fluorine-containing carboxylic acid cellulose separator | TEP | 98 | FEC | 2 | 1499 | 2 |
| Ex. 4 | fluorine-containing carboxylic acid cellulose separator | TEP | 95 | FEC | 5 | 1532 | 2 |
| Ex. 5 | fluorine-containing carboxylic acid cellulose separator | TEP | 90 | FEC | 10 | 1526 | 2 |
| Ex. 6 | fluorine-containing alcohol cellulose separator | EC/DEC | 100 | — | — | 1591 | 5 |
| Ex. 7 | fluorine-containing alcohol cellulose separator | EC/DEC | 95 | FEC | 5 | 1610 | 6 |
| Ex. 8 | fluorine-containing alcohol cellulose separator | TEP | 98 | FEC | 2 | 1530 | 2 |
| Ex. 9 | fluorine-containing alcohol cellulose separator | TEP | 95 | FEC | 5 | 1588 | 2 |
| Ex. 10 | fluorine-containing alcohol cellulose separator | TEP | 90 | FEC | 10 | 1575 | 3 |
| Ex. 11 | fluorine-containing carboxylic acid inorganic material separator | TEP | 98 | FEC | 2 | 1509 | 2 |
| Ex. 12 | fluorine-containing alcohol inorganic material separator | TEP | 98 | FEC | 2 | 1524 | 2 |
| Ex. 13 | inorganic material separator | TEP | 98 | FEC | 2 | 1328 | 3 |
| Comp. Ex. 1 | cellulose separator | EC/DEC | 100 | — | — | 1201 | 8 |

As follows, these results are considered. Note that, the present invention is not limited to the following discussion.

The first discharge capacity of the secondary battery in which a fluorine-containing carboxylic acid cellulose separator or a fluorine-containing alcohol cellulose separator is higher, compared with the secondary battery (Comparative Example 1) in which a cellulose separator is used (Examples 1 and 6, and Comparative Example 1). The reason of this is thought to be because the hydroxy group of the cellulose separator may react with the positive electrode or the negative electrode, which leads to a decrease of the capacity. Thus, it is thought that the fluorine-containing carboxylic acid cellulose separator or the fluorine-containing alcohol cellulose separator have an effect of suppressing the reaction with the electrode.

On the other hand, in the impact test, the amount of temperature increase at the time of impact on the secondary battery, in which a fluorine-containing carboxylic acid cellulose separator or a fluorine-containing alcohol cellulose separator is used, is lower compared with the secondary battery in which a cellulose separator is used (Examples 1 and 6, and Comparative Example 1). Thus, it is thought that the fluorine-containing carboxylic acid cellulose separator or the fluorine-containing alcohol cellulose separator have an effect of suppressing the amount of temperature increase in the secondary battery.

In addition, in the secondary battery in which a nonaqueous electrolyte solvent containing a phosphate compound and a fluorinated carbonate are used as a main solvent, it has been confirmed that the amount of temperature increase at the time of impact is further suppressed. The reason for this is thought to be because the viscosity of the phosphate electrolyte liquid is high, and thereby the short-circuit current at the time of impact is small and Joule heat becomes lower compared with EC:DEC.

On the other hand, it has been confirmed that, in the case of using an inorganic material separator, the amount of temperature increase at the time of impact is lower compared with the case of using a cellulose separator (Example 13 and Comparative Example 1). It is considered that the partial short-circuit due to the thermal shrinkage of separator hardly occurs and the Joule heat is small because the inorganic material separator has lower thermal shrinkage ratio. Therefore, the separator whose main component is an inorganic material is desirable than the cellulose separator from the standpoint of safety. Also, by using a fluorine-containing carboxylic acid inorganic material separator and fluorine-containing alcohol inorganic material separator obtained by the surface treatment of the inorganic material separator, there is obtained an effect of increasing the discharge capacity (Examples 11, 12 and 13). As mentioned above, this is considered to be because the reaction of hydroxy group with the electrode is suppressed. Therefore, the surface-treated separator is desirable when it is used for a battery.

In general, if the cell temperature is increased too high, the deterioration of the active substance and the liquid lack due to the evaporation of the electrolyte liquid occur, which is undesirable. Also, if there is a drastic temperature increasing by the impact, in the case where the battery is embedded in the device, there is a concern that the IC circuit or the peripheral device is negatively affected. Therefore, the cell in which the temperature increasing by the impact is also small is preferable from the point that it is not necessary to mount a device such as a thermal control unit, which is desirable.

The present application claims the priorities based on Japanese Patent Application No. 2011-038318, filed on Feb. 24, 2011 and Japanese Patent Application No. 2011-159107, filed on Jul. 20, 2011, all the disclosure of which is incorporated herein by reference.

The present invention was explained with reference to embodiments and Examples, but the present invention is not limited to the above-mentioned embodiments and the Examples. In the constituents and the detail of the present invention, various changings which are understood by a person ordinarily skilled in the art can be made within the scope of the invention.

(Additional Statement 1)

A separator for an electric storage device, comprising a cellulose derivative represented by formula (1):

formula (1)

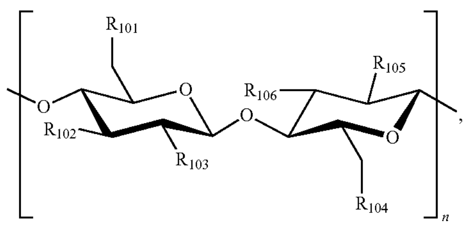

wherein, in formula (1), $R_{101}$ to $R_{106}$ each independently represent hydroxy group, a halogen-containing ester group or a halogen-containing ether group, and at least one of $R_{101}$ to $R_{106}$ is a halogen-containing ester group or a halogen-containing ether group; the halogen-containing ester group is represented by formula (2) and the halogen-containing ether group is represented by formula (3); and n is an integer number of 2 or more, and $R_{101}$ to $R_{106}$ is respectively independent in every n;

formula (2)

$$-O-\overset{O}{\overset{\|}{C}}-R_{201},$$

wherein, in formula (2), $R_{201}$ represents an alkyl group containing a halogen atom; and $$-O-R_{301} \quad \text{formula (3),}$$

wherein, in formula (3), $R_{301}$ represents an alkyl group containing a halogen atom.

(Additional Statement 2)

A separator for an electric storage device, wherein at least a part of hydroxy group on a fiber surface of a cellulose separator whose main component is a cellulose fiber is replaced by a halogen-containing ester group represented by formula (4):

formula (4)

$$-O-\overset{O}{\overset{\|}{C}}-R_{201},$$

wherein, in formula (4), $R_{201}$ represents an alkyl group containing a halogen atom.

(Additional Statement 3)

A separator for an electric storage device, wherein at least a part of hydroxy group on a fiber surface of a cellulose separator whose main component is a cellulose fiber is replaced by a halogen-containing ether group represented by formula (5):

$$-O-R_{301} \quad \text{formula (5),}$$

wherein, in formula (5), $R_{301}$ represents an alkyl group containing a halogen atom.

(Additional Statement 4)

The separator for an electric storage device according to Additional Statement 2 or 3, wherein the cellulose separator contains 30 mass % or more of the cellulose fiber.

(Additional Statement 5)

A separator for an electric storage device, wherein at least a part of hydroxy group on a fiber surface of an inorganic material-containing separator whose main component is an inorganic fiber is replaced by a halogen-containing ester group represented by formula (6):

formula (6)

$$-O-\overset{O}{\overset{\|}{C}}-R_{201},$$

wherein, in formula (6), $R_{201}$ represents an alkyl group containing a halogen atom.

(Additional Statement 6)

A separator for an electric storage device, wherein at least a part of hydroxy group on a fiber surface of an inorganic material-containing separator whose main component is an inorganic fiber is replaced by a halogen-containing ether group represented by formula (7):

$$-O-R_{301} \quad \text{formula (7),}$$

wherein, in formula (7), $R_{301}$ represents an alkyl group containing a halogen atom.

(Additional Statement 7)

The separator for an electric storage device according to Additional Statement 5 or 6, wherein the inorganic material-containing separator contains 30 mass % or more of the inorganic fiber.

(Additional Statement 8)

An electric storage device, comprising the separator for an electric storage device according to any one of Additional Statements 1 to 7, a negative electrode comprising a negative electrode active substance, and an electrolyte liquid comprising a supporting salt and a nonaqueous electrolyte solvent.

(Additional Statement 9)

The electric storage device according to Additional Statement 8, wherein the negative electrode active substance comprises at least one selected from silicone and silicone oxide.

(Additional Statement 10)

The electric storage device according to Additional Statement 9, wherein the negative electrode active substance comprises silicon, silicon oxide and carbon material.

(Additional Statement 11)

The electric storage device according to any one of Additional Statements 8 to 10, wherein the nonaqueous electrolyte solvent comprises a fluorinated carbonate.

(Additional Statement 12)

The electric storage device according to Additional Statement 11, wherein the nonaqueous electrolyte solvent comprises a phosphate as a main solvent.

(Additional Statement 13)

A method for producing a separator for an electric storage device, comprising making a cellulose separator, whose main component is cellulose fiber, come into contact with a solution comprising a halogen-containing carboxylic acid represented by formula (8):

formula (8)

$$H-O-\overset{\overset{\displaystyle O}{\|}}{C}-R_{401},$$

wherein, in formula (8), $R_{401}$ represents an alkyl group containing a halogen atom.

(Additional Statement 14)

The method for producing a separator for an electric storage device according to Additional Statement 13, comprising carrying out heat-treatment in a state where the cellulose separator is immersed in the solution.

(Additional Statement 15)

The method for producing a separator for an electric storage device according to Additional Statement 14, wherein a temperature of the solution is set to be 50° C. or higher and 160° C. or lower by the heat-treatment.

(Additional Statement 16)

A method for producing a separator for an electric storage device, comprising making a cellulose separator, whose main component is cellulose fiber, with a solution comprising a halogen-containing alcohol represented by formula (9):

$$H—O—R_{501} \quad \text{formula (9)},$$

wherein, in formula (9), $R_{501}$ represents an alkyl group containing a halogen atom.

(Additional Statement 17)

The method for producing a separator for an electric storage device according to Additional Statement 16, comprising carrying out heat-treatment in a state where the cellulose separator is immersed in the solution.

(Additional Statement 18)

The method for producing a separator for an electric storage device according to Additional Statement 16 or 17, wherein a temperature of the solution is set to be 50° C. or higher and 150° C. or lower by the heat-treatment.

(Additional Statement 19)

A method for producing a separator for an electric storage device, comprising making an inorganic material-containing separator, which comprises an inorganic fiber comprising a hydroxy group on a surface thereof, come into contact with a solution comprising at least a halogen-containing carboxylic acid represented by formula (10):

formula (10)

$$H-O-\overset{\overset{\displaystyle O}{\|}}{C}-R_{401},$$

wherein, in formula (10), $R_{401}$ represents an alkyl group containing a halogen atom.

(Additional Statement 20)

The method for producing a separator for an electric storage device according to Additional Statement 19, comprising carrying out heat-treatment in a state where the inorganic material-containing separator is immersed in the solution.

(Additional Statement 21)

The method for producing a separator for an electric storage device according to Additional Statement 20, wherein a temperature of the solution is set to be 50° C. or higher and 160° C. or lower by the heat-treatment.

(Additional Statement 22)

A method for producing a separator for an electric storage device, comprising making an inorganic material-containing separator, which comprises an inorganic fiber comprising a hydroxy group on a surface thereof, come into contact with a solution comprising at least a halogen-containing alcohol represented by formula (11):

$$H—O—R_{501} \quad \text{formula (11)},$$

wherein, in formula (11), $R_{501}$ represents an alkyl group containing a halogen atom.

(Additional Statement 23)

The method for producing a separator for an electric storage device according to Additional Statement 22, comprising carrying out heat-treatment in a state where the inorganic material-containing separator is immersed in the solution.

(Additional Statement 24)

The method for producing a separator for an electric storage device according to Additional Statement 22 or 23, wherein a temperature of the solution is set to be 50° C. or higher and 150° C. or lower by the heat-treatment.

(Additional Statement 25)

The method for producing a separator for an electric storage device according to any one of Additional Statements 19 to 24, wherein the inorganic fiber is alumina fiber, carbon fiber or glass fiber.

(Additional Statement 26)

The method for producing a separator for an electric storage device according to Additional Statement 25, wherein the inorganic material-containing separator comprises alumina particle or silica particle.

(Additional Statement 27)

An electric storage device, comprising a separator for an electric storage device produced by the production method according to any one of Additional Statements 13 to 26, a negative electrode comprising a negative electrode active substance, and an electrolyte liquid comprising a supporting salt and a nonaqueous electrolyte solvent.

(Additional Statement 28)

The electric storage device according to Additional Statement 27, wherein the negative electrode active substance comprises at least one selected from silicone and silicone oxide.

(Additional Statement 29)

The electric storage device according to Additional Statement 28, wherein the negative electrode active substance comprises silicon, silicon oxide and carbon material.

(Additional Statement 30)

The electric storage device according to Additional Statement 28 or 29, wherein the nonaqueous electrolyte solvent comprises a fluorinated carbonate.

(Additional Statement 31)

The electric storage device according to Additional Statement 30, wherein the nonaqueous electrolyte solvent comprises a phosphate as a main solvent.

INDUSTRIAL APPLICABILITY

An exemplary embodiment of the invention can be utilized in every industrial field in need of a power supply and in an industrial field concerning a transportation, a storage and a supply of an electrical energy. Specifically, it can be utilized, for examples, for a power supply of a mobile device such as a mobile phone and a laptop computer; a power supply of a moving or a transport medium such as a train, a satellite and a submarine, and which includes an electric vehicle such as an electric car, a hybrid car, an electric motorcycle and an electric power-assisted bicycle; a back-up power supply such as UPS; and a power storage device of an electric power which is generated by a solar power generation or a wind power generation.

REFERENCE SIGNS LIST a negative electrode
b separator
c positive electrode
d negative electrode collector
e positive electrode collector
f positive electrode lead terminal
g negative electrode lead terminal

What is claimed is:

1. A separator for an electric storage device, comprising an inorganic material-containing separator whose main component is an inorganic fiber, wherein at least a part of hydroxyl group on a surface of the inorganic fiber is modified to a halogen-containing ester group represented by formula (6):

formula (6)

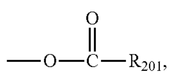

wherein, in formula (6), $R_{201}$ represents an alkyl group containing a halogen atom.

2. A separator for an electric storage device, comprising an inorganic material-containing separator whose main component is an inorganic fiber, wherein a hydroxyl group on a surface of the inorganic fiber is modified to a halogen-containing ether group represented by formula (7):

$—O—R_{301}$ formula (7), wherein, in formula (7), $R_{301}$ represents an alkyl group containing a halogen atom.

3. The separator for an electric storage device according to claim 1, wherein the inorganic fiber is alumina fiber, carbon fiber or glass fiber.

4. The separator for an electric storage device according to claim 1, wherein the inorganic material-containing separator contains 30 mass % or more of the inorganic fiber.

5. A separator for an electric storage device, comprising a cellulose derivative represented by formula (1):

formula (1)

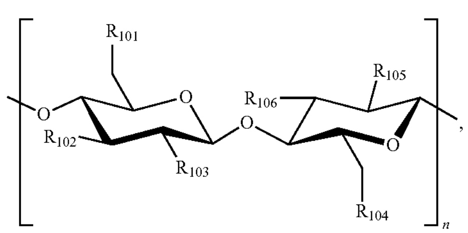

wherein, in formula (1), $R_{101}$ to $R_{106}$ each independently represent hydroxy group, a halogen-containing ester group or a halogen-containing ether group, and at least one of $R_{101}$ to $R_{106}$ is a halogen-containing ester group or a halogen-containing ether group; the halogen-containing ester group is represented by formula (2) and the halogen-containing ether group is represented by formula (3); and n is an integer number of 2 or more, and $R_{101}$ to $R_{106}$ is respectively independent in every unit;

formula (2)

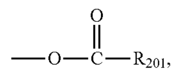

wherein, in formula (2), $R_{201}$ represents an alkyl group containing a halogen atom; and $—O—R_{301}$ formula (3), wherein, in formula (3), $R_{301}$ represents an alkyl group containing a halogen atom.

6. A separator for an electric storage device, comprising a cellulose separator whose main component is a cellulose fiber, wherein at least a part of hydroxy group on the cellulose fiber is modified to a halogen-containing ether group represented by formula (5):

$—O—R_{301}$ formula (5), wherein, in formula (5), $R_{301}$ represents an alkyl group containing a halogen atom.

7. A separator for an electric storage device, comprising a cellulose separator whose main component is a cellulose fiber, wherein at least a part of hydroxy group on the cellulose fiber is modified to a halogen-containing ester group represented by formula (4):

formula (4)

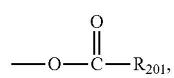

wherein, in formula (4), $R_{201}$ represents an alkyl group containing a halogen atom.

8. The separator for an electric storage device according to claim 6, wherein the cellulose separator contains 30 mass % or more of the cellulose fiber.

9. An electric storage device, comprising the separator for an electric storage device according claim 1, a negative electrode comprising a negative electrode active substance, and an electrolyte liquid comprising a supporting salt and a nonaqueous electrolyte solvent.

10. The electric storage device according to claim 9, wherein the negative electrode active substance is at least one selected from silicone and silicone oxide.

11. The electric storage device according to claim 9, wherein the nonaqueous electrolyte solvent comprises a fluorinated carbonate.

12. The electric storage device according to claim 11, wherein the nonaqueous electrolyte solvent comprises a phosphate as a main solvent.

* * * * *